June 23, 1936. W. M. HORTON 2,044,986
METAL EXTRUDING DIE
Filed Dec. 14, 1935
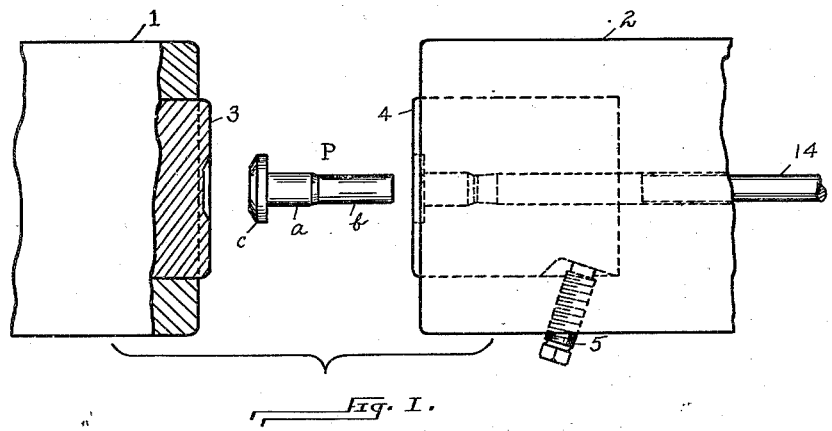
Fig. I.
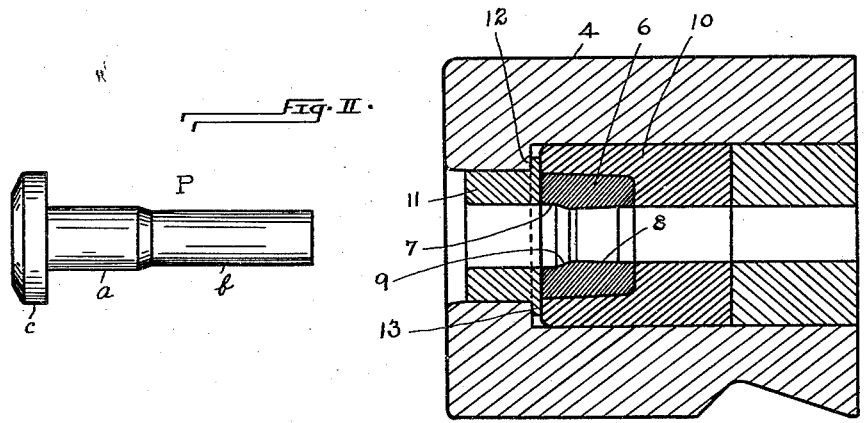
Fig. II.
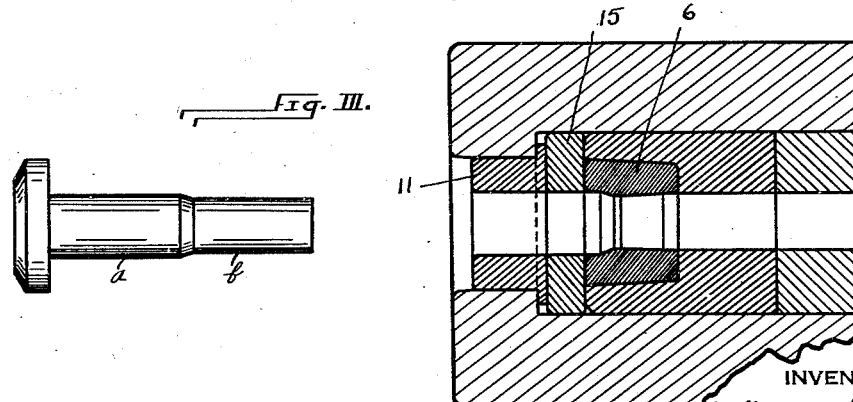
Fig. III.
INVENTOR
William M. Horton
BY
Christy and Wharton
his ATTORNEYS Patented June 23, 1936

2,044,986

UNITED STATES PATENT OFFICE 2,044,986

METAL-EXTRUDING DIE

William M. Horton, Sewickley, Pa., assignor to Pittsburgh Screw & Bolt Corporation, a corporation of Pennsylvania Application December 14, 1935, Serial No. 54,451

1 Claim. (Cl. 10—24)

The invention relates to metal-extruding machinery. In the manufacture of bolts it is known practice to extrude a cylindrical blank within a die, reducing its diameter and increasing its length. The invention consists in a die for such purpose, refined and elaborated in structure, and rendered more durable and more adaptable to industrial conditions.

The invention is illustrated in the accompanying drawing. Fig. I is a fragmentary view, partially in elevation, partially in axial section, showing a pair of press members, in one of which the extrusion die is carried; these parts co-operating to elongate and to reduce the diameter of an essentially cylindrical blank throughout a portion of its length. Fig. II is a view to larger scale and in axial section of the extrusion die detached; and Fig. III is a like view of the same die with a removable member in position. In all of the figures a piece of work is shown in elevation, adjacent the extrusion die; and it is shown in fabricated condition—that is to say, after it has undergone the extrusion operation.

The co-operating press members 1 and 2 will be understood to be mounted in a machine which in its operation causes reciprocating movement and drives them together with the power requisite to effect extrusion. The dies 3 and 4 are mounted in the members 1 and 2. The die 3 is the driving die or hammer die, and the die 4 is the extrusion die or anvil die. It is the function of these dies to effect extrusion of a cylindrical blank, such as a bolt blank of the diameter of the portion a of the piece of work P, to the smaller diameter of the portion b. The extrusion die 4 is removably secured in place in the member 2 in suitable and known manner by the set-screw 5.

The extrusion die consists essentially of a block 6 penetrated by a bore. In the bore of this block the piece of work is shaped and extruded. The bore is at its outer end 7 of larger diameter (adapted to receive freely the advancing end of the piece of work to be extruded), and at its inner end 8 of smaller diameter (the diameter to which the extruded portion of the work is reduced). Between these outer and inner ends the bore is of tapering and diminishing diameter, from the outer end inward, as indicated at 9. Manifestly the block 6 is necessarily of great hardness. For the fabrication of steel bolts, it may, for example, be formed of that tungsten-carbide cobalt alloy to be found on the market under the name carboloy. A die formed of such material is very expensive, and, while very hard, does not of itself alone have the strength necessary to resist the impact incident to service; and it is, therefore, good practice to provide a carrier block 10 of relatively cheaper material, but of very high tensile strength, and to mount the die in the carrier block under great compression, thereby imparting to the die 6 augmented resistance to the stress of service. The assembly of the block 6 within the carrier 10 may advantageously be mounted in a body 4 formed of softer and much less expensive material.

The block 6, of necessarily hard material (such, for example, as that specified) is, within the limits of present knowledge, necessarily brittle (relatively speaking). It is prone to crumble under the stress of service; and in consequence costs of maintenance are high, and as the press continues in operation defects in product are likely to appear.

I have perceived, and herein lies the first feature of my invention, that the extrusion block may be a compound block, consisting of two parts; that it suffices that the tapering portion 9 of the bore be formed in material of maximum hardness; that the outer portion of the block need not be of so great hardness; that it is advantageous if the outer portion of the block be made of such softer and less costly material as steel of high tensile strength; that, in consequence, the cost of the whole may be reduced; but, more important, that by the formation of a compound block with outer portion of softer and tougher material, the outer portion will serve as a cushioning member, relieving the inner portion in some measure of the full stress of the impacts of service, preventing the inner portion from crumbling as (because of its brittle nature) it is prone to do, and in consequence very materially and substantially increasing the life of and insuring the integrity of the whole. The die block then consists of an inner portion, to which the numeral 6 is immediately applied, and an outer portion 11.

If, with Fig. II in view, the two-part block 6, 11 were indeed made in one piece and made of such material of great hardness as that specified for piece 6, the block would not have adequate durability; it would crumble under the stress of service.

Such benefit and advantage is the more clearly apparent when the circumstances of bolt manufacture are more fully considered. In the course of such manufacture a length of rod of circular cross-section, and of uniform diameter, corresponding to the portion a of the work P of the drawing, is first upset at one end, and a head c formed. The blank then consists of a shank of uniform diameter (the diameter of the portion $a$) bearing at one end the head $c$. The step in the course of manufacture with which the present invention has to do is the attenuation of the shank from the end opposite the headed end toward the headed end; that is to say, the development by extrusion of an elongate and slender terminal portion $b$ upon the blank. In the pressing operation by which attenuation is effected the closing thrust of the dies is necessarily arrested by the abutment of the head upon the face of the extrusion die; and manifestly such abutment under force has shattering tendency upon the die. When, however, the extrusion die is made compound and the outer end, upon which the head immediately abuts, is formed of relatively tough and shatter-resisting material, the inner portion of the die, so cushioned, is relieved in part of shattering stress, and its life and utility are in consequence prolonged.

The outer portion 11 of the compound die block serves as a spacer in defining the length of the portion $a$ of the blank (the unthreaded portion of the finished bolt). By increasing or decreasing the length of the portion 11, the length of the portion $a$ of the blank may be increased or diminished at will.

Referring particularly to Fig. II, the features of actual structure may be briefly enumerated. The anvil member 4 is provided with a stepped bore; within this bore and abutting upon the step 12 the assembly of die block and carrier are seated. Such abutment secures the die block from movement in right to left direction; while on the right, as will be understood, anvil member and die-carrier abut upon an immovable backing. The outer portion 11 of the die block is conveniently provided with a flange 13 which in the assembly lies between the outer face of the carrier block 10 and the step 12. By such provision the die block is secured against displacement when, after operation, a pusher 14 (Fig. I) advances from right to left and drives the piece of work out of the die block.

The cushioning of the body 6 may be augmented by interposing between the inner and outer portions 6 and 11 of the compound die block a block 15 (Fig. III). The block 15 is perforate, and the bore within it is of uniform diameter with, and in the assembly forms a continuation of, the bore within the outer member 11 of the die block. The block 15, being employed, may be variable in length, and so may serve as a spacer in determining the absolute length of the portion $a$ of the worked blank and the length of the portion $b$ relatively to the portion $a$. The material of which the block 15 is formed need not be of such great hardness as to be comparable with the portions 6 and 11; it may indeed be, relatively speaking, of soft material; and the less its thickness the softer it may be. I have found that a block 15 reduced in thickness to a mere shim, and so having no appreciable value in the matter of adapting the machine to variety in dimension, and made of copper, has appreciable value in improving the cushioning effect and in prolonging the life of the die.

I claim as my invention:

In a bolt-blank forming machine the combination of a hammer die and an extrusion die, the extrusion die being formed with a bore of two diameters and with intermediate taper and of compound structure, including an inner part and an outer part; the inner part comprising a block of great hardness but of little tensile strength mounted within a carrier block of great tensile strength, the portion of the bore of small diameter and the taper being formed in the said block of great hardness; the outer part of the extrusion die being formed of softer and tougher material, in which is formed the portion of the bore of larger diameter, such outer part, engaged by the head of the blank, constituting in service a cushion, relieving the inner part of the full force of impact of the hammer die.

WILLIAM M. HORTON.